United States Patent [19]

Nakamura et al.

[11] 4,315,548
[45] Feb. 16, 1982

[54] TRACTOR WITH A TRACTION LOAD SENSING DEVICE

[75] Inventors: Norimi Nakamura, Sakai; Shigeaki Okuyama, Kawachinagano; Shigekazu Hasegwa, Sakai; Yoshiyuki Katayama, Osaka; Mituhiko Obe, Sakai, all of Japan

[73] Assignee: Kubota, Ltd., Japan

[21] Appl. No.: 143,933

[22] Filed: Apr. 24, 1980

[30] Foreign Application Priority Data

Oct. 1, 1979 [JP] Japan .................. 54-136413[U]
Oct. 18, 1979 [JP] Japan .................. 54-144534[U]

[51] Int. Cl.³ .......................................... A01B 63/112
[52] U.S. Cl. ........................................ 172/430; 172/7
[58] Field of Search ............... 172/3, 7, 9, 10, 11, 172/12, 430; 280/405 B, 446 R, 446 A

[56] References Cited

U.S. PATENT DOCUMENTS

| | | | |
|---|---|---|---|
| 3,435,901 | 4/1969 | Bennett et al. | 172/9 |
| 3,628,420 | 12/1971 | Boueil et al. | 172/7 X |
| 3,751,903 | 8/1973 | Bauchet et al. | 172/7 X |
| 3,917,002 | 11/1975 | Mueller, Jr. | 172/9 |
| 3,994,348 | 11/1976 | Schowalter | 172/9 |

*Primary Examiner*—Richard T. Stouffer
*Attorney, Agent, or Firm*—Kane, Dalsimer, Kane, Sullivan and Kurucz

[57] ABSTRACT

A tractor has a traction load sensing device needed for effecting regulation of the soil-engaging implement load. Sensor body of the traction load sensing device is accommodated in a casing establishing complete sealing or approximately establishing such state, and the casing is accommodated in and releasably secured to a transmission case of the tractor in an oil-tight manner.

7 Claims, 10 Drawing Figures

TRACTOR WITH A TRACTION LOAD SENSING DEVICE

BACKGROUND OF THE INVENTION (1) Field of the Invention

This invention relates to a tractor with a traction load sensing device for a tractor, as is needed for effecting load regulation of a soil-engaging implement attached to the tractor, such for instance as plow tilling-depth regulation.

(2) Prior Art of the Invention

A traction load sensing device has conventionally been incorporated in a tractor in such a manner that a sensor bar is supported on a sensor case secured to and downwardly protruding under a bottom plate of a transmission case of the tractor, so as to be displaced responsive to the traction load exerted on lower links, and a detection device adapted to detect the amount of the displacement of the sensor bar is accommodated within the sensor case. The sensor case has thus inevitably been positioned low near the ground under the tractor, and therefore apt to be hit by some possible obstacles on the ground, such for instance as stones, and be deformed or injured. Besides, heavy traction load exerted on the sensor bar from the lower links must safely be borne by the securing connection between the sensor case and the transmission case, and the connecting portions of these cases must therefore be further quite sturdy one.

SUMMARY OF THE INVENTION

In view of the drawbacks of the prior art as mentioned hereinabove, this invention has as its primary object to eliminate the danger of injuring the sensor case and the detection device housed therein. Another object is to provide the structure to facilitate mounting and dismantling the detection device, with the structure itself made very simple.

In order to attain the objects, a tractor provided with a traction load sensing device according to this invention comprises:

a transmission case constituting a structural member of the tractor, a pair of lower links functioning for connecting the soil-engaging implement to the transmission case, a sensor bar mounted on the transmission case in such a manner as to show displacement responsive to the implement traction load exerted on the lower links, and a detection device adapted to detect the amount of the displacement of the sensor bar, the detection device being accommodated in and secured to the transmission case in an oil-tight manner, provided, however, with means for allowing access thereto—for enabling easy mantling and dismantling thereof—from outside the transmission case.

With this construction, the sensor bar is sturdily supported by the transmission case in such manner as to show displacement responsive to the traction load exerted on the lower links, making effective use of the sufficient structural strength of the transmission case; and since the detection device to detect the amount of the displacement of the sensor bar is accommodated within the transmission case, it has now been made possible to position the detection device on a level above the ground substantially higher than in the conventional case of providing same underneath the transmission case, thus to the advantage of preventing the detection device from being hit by some obstacles as stones or the like and thereby deformed or injured.

Still other objects and advantages of this invention will become clear from the detailed description now to follow.

BRIEF DESCRIPTION OF THE DRAWINGS

The drawings show, by way of example, some embodiments of the tractor provided with a traction load sensing device according to this invention, wherein.

DETAILED DESCRIPTION OF THE PREFERRED EMBODIMENTS

Figure 1:
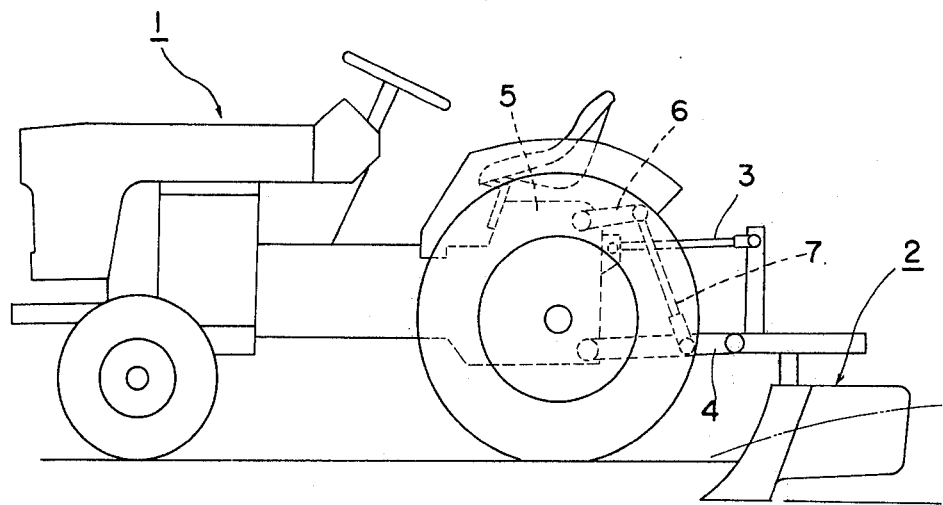
FIG. 1 is an overall side elevation of an entirety of cultivator assembly of the seated operator type.

FIG. 1 shows an entirety of cultivator assembly of the seated operator type, constructed with: a tractor (referred to hereinafter as the "vehicle") (1); a plow (2) which is given as a specific example of the soil-engaging implement, as will till up the soil as the vehicle travels, and which is attached at the rear of the vehicle via a top link (3) and a pair of right and left lower links (4), with possibility of raising and lowering; and the raising and lowering actuation means comprising an oilhydraulic cylinder (5), a pair of right and left lift arms (6) operatively connected to the oilhydraulic cylinder (5) to thereby be raised and lowered in pivotal rocking about a transverse horizontal axis at a rear end portion of the vehicle (1), and a pair of right and left lift rods (7) articulatorily interconnecting the respective lift arms (6) and lower links (4). Thus, the plow (2) may be raised and lowered by the pivotal rocking of the lift arms (6) as caused in turn by the expanding and contracting actuation of the oilhydraulic cylinder (5).

Figure 2:
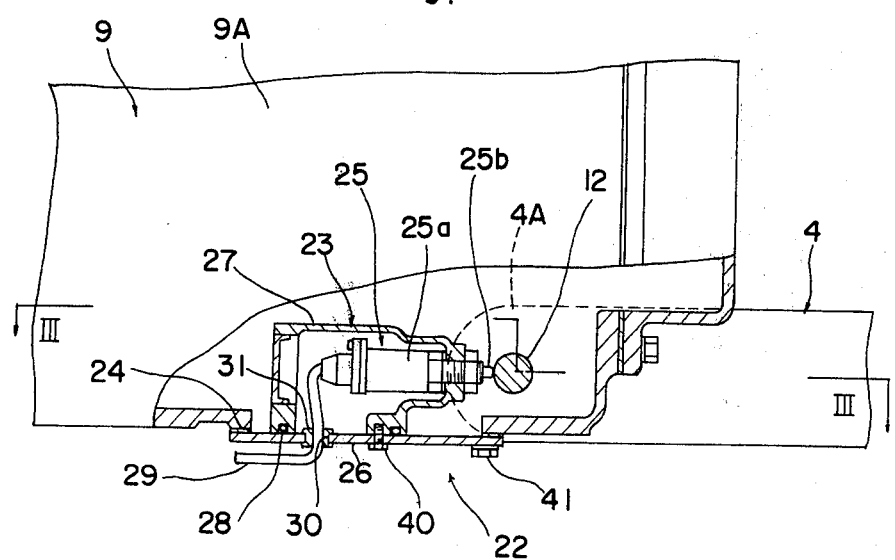
FIG. 2 is an enlarged side elevation of a portion of the cultivator with cutout showing the parts essential to this invention mostly in vertical section thereof taken on line II—II in FIG. 3.
Figure 3:
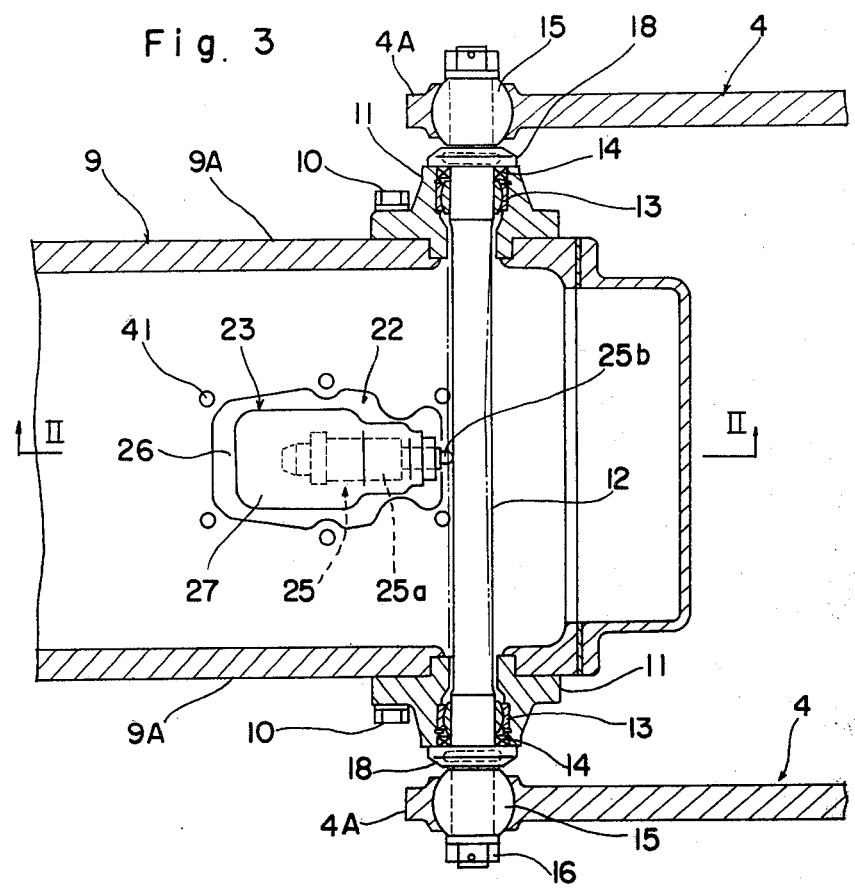
FIG. 3 is a horizontal sectional view of the said essential parts taken on line III—III in FIG. 2.
Figure 4:
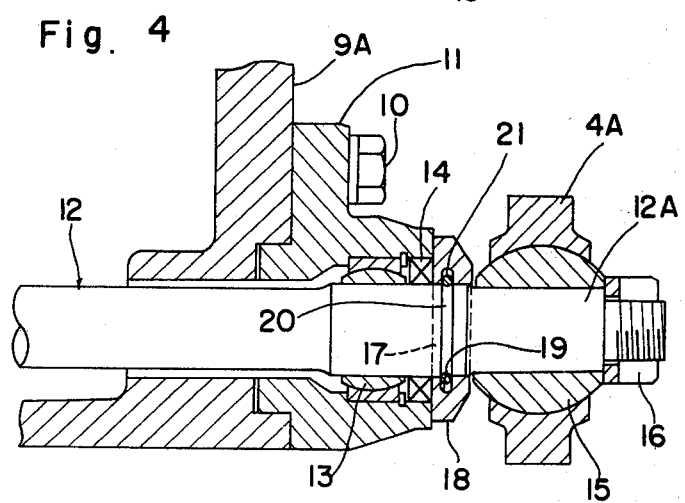
FIG. 4 is a further enlarged vertical sectional view of a lateral side portion of the cultivator shown in FIG. 3.
Figure 5:
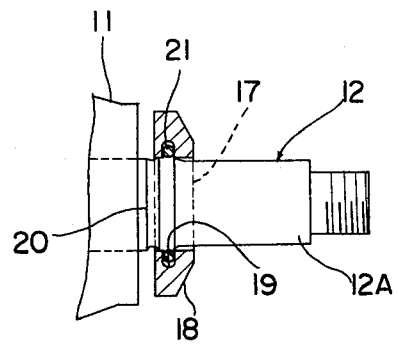
FIG. 5 is a fragmentary view, partly in section, of some parts shown in FIG. 4, at an intermediary stage during the mounting process.

FIGS. 2-4 show an embodiment of tractor load sensing device to detect tension exerted on the pair of lower links (4) as the traction load, and construction of the device is now described hereunder:

A shaft-like member (referred to in this specification as the "sensor bar") (12) is disposed to extend through both lateral side walls (9A) of the transmission case (9) of the vehicle (1), at a rear end portion thereof, and also through brackets (11) fixed to the respective walls by means of bolts (10), and is supported via the respective spherical bushes (13) and oil-tight sealing gaskets (14), with both ends laterally extending out therethrough. Pivotally and tiltably connected to shank portion (12A) of each of the laterally extending ends of the sensor bar (12) via a spherical bush (15) clamped on the said shank portion (12A) by means of a nut (16) thereon is a front end portion (4A) of the respective lower link (4). In between the bracket (11) and the front end portion (4A) of the lower link (4) there is interposed an annular cover (18) fitted on the sensor bar (12), thus formed with center opening or through bore (17) therefor. An annular groove (19) is formed inwardly on the peripheral wall of the through bore (17) of the cover (18) and a corresponding annular groove (20) is formed on the outer periphery of the sensor bar (12). As a member to resiliently keep both annular grooves (19, 20) in registration to each other, there is fitted a C-shaped spring (21) in the grooves, thus resiliently preventing the sensor bar (12) from slidingly falling out in the axial direction thereof. Such fitting of the C-shaped spring (21) is possible since, as is shown in FIG. 5, the said spring resiliently radially expanded on the normal shank portion (12A) axially outwardly of the groove (20) may freely be accordingly within the groove (19) of the annular cover (18).

In a bottom plate of the transmission case (9) there is formed an opening (22) for the convenience of maintenance and inspection, as will become clear as the description proceeds. Through this opening (22), a casing (23) is inserted into the cavity in the transmission case (9) and is releasably secured to the transmission case (9) by means of bolts (40), with a gasket (24) interposed therebetween for oil-tight sealing. Within the casing (23) there is accommodated, establishing complete sealing or approximately establishing such state, a detection device (25) adapted to detect, as the traction load, the amount of displacement of the sensor bar (12) responsive to tension force acting via the pair of lower links (4). The detection device (25) comprises a sensor body (25a) and a sensor (25b) retractably mounted on the sensor body (25a).

The casing (23) comprises a releasable lid (26) for the said opening (22) and a casing portion proper (27) encasing the sensor body (25a). Both these constituents are secured to each other by means of bolts (41) with an O-ring (28) interposed therebetween. In the releasable lid (26) there is formed a perforation (30) equipped with a rubber capping (31) as fitted to cover up the brim thereof for tightly bringing out electrical cable or wire means (29) leading to the sensor body (25a).

The casing (23) may thus be very easily mounted in an oil-tight manner through the opening (22). Modification of the conventional transmission case needed therefor is rather slight, and the overall structure as well as the fabrication and mounting works is simplified to thus realize cost reduction.

After mounting the detection device (25), zero-adjustment may preferably be done electrically.

Figure 6:
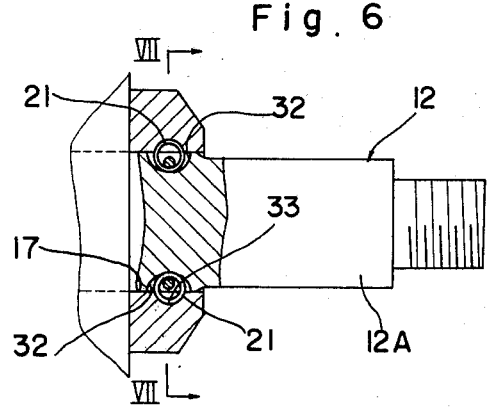
FIG. 6 is a yet further enlarged fragmentary view taken line VI—VI in FIG. 7, partly in section similar to FIG. 5 but showing here a modified embodiment.
Figure 7:
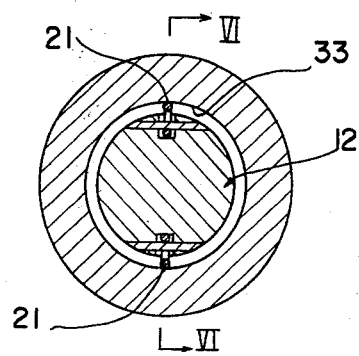
FIG. 7 is a cross-sectional view taken on line VII—VII in FIG. 6.

Structure for preventing the sensor bar (12) from slidingly falling out in the axial direction thereof is by no means limited to the specific form shown in FIGS. 4-5. A modified form is shown by way of example in FIGS. 6-7, in which in two peripheral portions of the sensor bar (12) at this end portion there are formed two depressions or grooves (32) with arcuate sectional form in the axial direction of the sensor bar (12), as defined by two parallel side walls extending in the said axial direction, and in registration therewith there is formed an annular groove (33) inwardly on the peripheral wall of the through bore (17) on the side of the transmission case, similar to the one described wth respect to the former embodiment shown in FIG. 4. In each of the grooves there is fitted an O-shaped resilient ring (21) to thereby resiliently keep the sensor bar (12) from slipping off.

Figure 8:
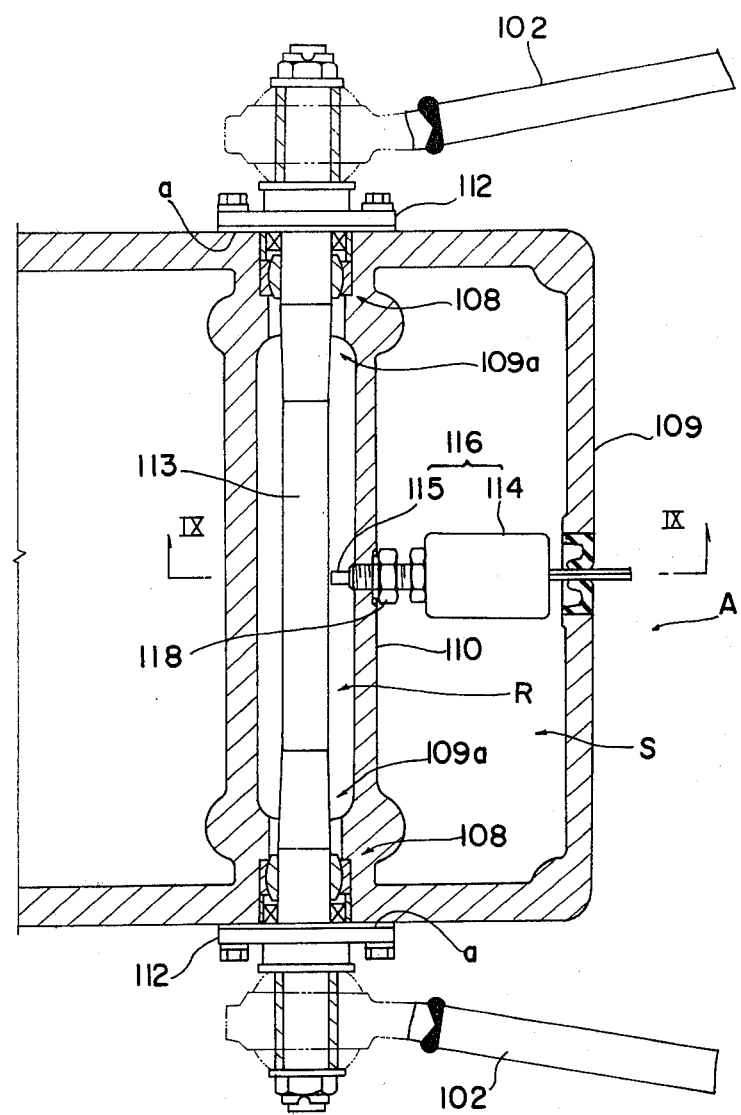
FIG. 8 is a horizontal sectional view similar to FIG. 3 but showing here another embodiment taken on line VIII—VIII in FIG. 9.
Figure 9:
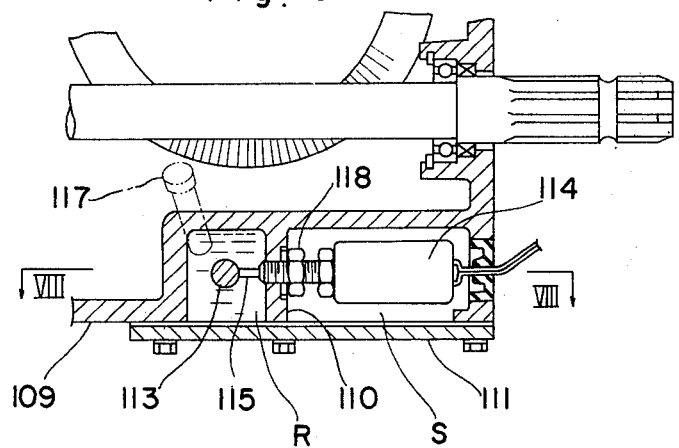
FIG. 9 is a vertical sectional view taken on line IX—IX in FIG. 8.
Figure 10:
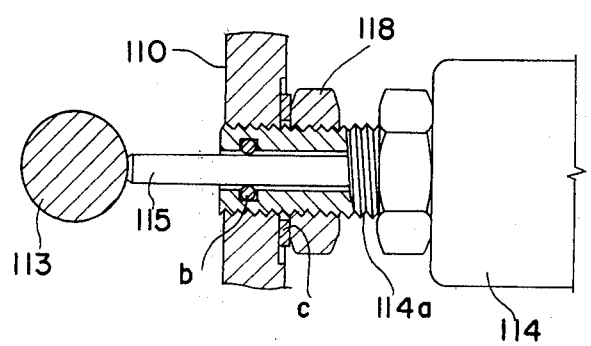
FIG. 10 is an enlarged fragmentary view of a portion of the parts shown in FIG. 9, showing the details thereof.

FIGS. 8-10 show another embodiment of the traction load sensing device, the construction of which is now described hereunder:

Designated at (109) is the transmission case of the vehicle, which is located at a rear portion of the vehicle and serves also to support rear axle of the vehicle, and a rear bottom portion thereof is depressed inwardly. Outwardly open depression is thereby provided, and a transverse wall (110) to partition the depression into front and rear portions with respect to the vehicle travel is provided integrally with the transmission case (109). In each side wall of the transmission case (109) there is formed an opening (109a) in communication with the said front portion of the depression. Open bottom of the depression and both these side openings (109a) are sealed up with lids (111),(112),(112), respectively, with insertion of gaskets (a), thus providing two individually tightly sealed cavities (R),(S) in the depression of the transmission case (109), as designated in FIG. 8 generally as a case portion (A). However the cavity (S) may not be sealed completely. In the said openings (109a) formed on both sides of this case portion (A) there are provided spherical joints (108),(108), respectively, as are prevented by the said respective lids (112),(112) from slipping off laterally from the transmission case (109). A sensor bar (113) extending transversely of the vehicle travel direction is supported by the said spherical joints (108),(108), thus for free resilient bending, with both ends thereof piercing out through the lids (112),(112), respectively. Connected to the respective pierced-out end portions of the sensor bar (113) are connectors (102),(102), thus axis of the sensor bar (113) is made to resiliently be bent responsive to the traction load of the attached implement (not shown in FIG. 8).

Main central portion of the sensor bar (113) is thus encased in the tightly sealed cavity (R), while in the other cavity (S) in the rear thereof there is secured a sensor body (114) of a detection device (116) adapted to measure the amount of displacement of a sensor (115) relative to the sensor body (114), as transduced into the corresponding voltage output, with the sensor (115) thereof pierced through the said partitioning wall (110), in a state urged resiliently so that the tip end always abuts on a central portion of the bar (113). The detection device (116) is electrically connected with a control valve not shown for the said oilhydraulic cylinder (5) for the raising and lowering actuation of the soil-engaging implement (2) as shown in FIG. 1. Construction is thus provided to detect by the detection device (116) the traction load of the soil-engaging implement in accordance with the to and fro displacement of the sensor (115) following the bar (113) as bent thereby, and to actuate the oilhydraulic cylinder for raising and lowering the soil-engaging implement responsive to the detected actual load as is compared with a predetermined value as is set as the proper load in view of the desired cultivation depth and the actual state of the soil, thus for automatically maintaining the traction load as confined within the set proper range.

As shown in FIG. 9, a suitable plug (117) is provided for sealing up, with insertion of a suitable O-ring not shown, an opening formed in a wall of the sealed cavity (R) for filling same with a rust-preventive liquid as accommodated therein.

FIG. 10 shows in some detail how to secure the sensor body (114) with the sensor (115) piercing through the partitioning wall (110). As is seen, an O-ring (b) is inserted in between inner surface of a central through bore of a tip end of the sensor body (114) and outer surface of the sensor (115) extending out therethrough. The tip end of the sensor body (114) has outer screw-threading (114a) which is in tightly screwed engagement with the partitioning wall (110) and on which is also secured a lock nut (118) with a sealing gasket (c) inserted in between the lock nut (118) and the opposed surface of the wall (110). With this construction, zero-adjustment of the detection device (116) with respect to a given specific sensor bar (113) is made very easy and convenient, and the sensor body (114) is kept out of the rust-preventive liquid, thus free from being electrically affected thereby, while the liquid functioning to effectively prevent the bar (113) from rusting.

By the way, it is preferable to provide the lid (111) in such two-segment construction that the two segments are individually releasably secured to seal up the tightly sealed cavity (R) and cover up the other cavity (S), respectively, since the said zero-adjustment of the detection device (116) after completing the mounting thereof is hereby made quite easy and convenient without causing the rust-preventive liquid to leak out by such adjustment precedure.

With the embodiment of the detection device described hereinabove with respect to FIGS. 8–10, further advantages are thus obtained in addition to those already obtained with the former embodiment previously described with respect to FIGS. 2–7 retained as well, as follows.

Namely, by providing a sealed cavity (R) for accommodating therein the sensor bar (113) and the rust-preventive liquid as well filled therein and by providing another cavity (S) for accommodating therein the sensor body (114) in a dry state, it is made possible, as has already been described, to eliminate degradation of the detection precision as would be caused by rusting of the sensor bar (113), without electrically affecting the sensor body by the rust-preventive liquid; and furthermore by providing the sensor bar (113) as is supported directly by the transmission case (109), making the sturdily constructed transmission case (109) itself thus directly bear the heavy traction load, it is made possible to substantially enhance the mounting strength of the sensor bar (113) in comparison with another possible structure as for instance would be provided with an individual separate casing, for encasing the sensor bar therein, as must then be connected to the transmission case (109), and at the same time to thereby simplify the entire transmission case structure. All in all, the traction load detection device is made hereby to maintain the high precision for quite a long period of time with the improvement quite simple in structure.

We claim:

1. A tractor with a soil-engaging implement and a traction load sensing device needed for effecting regulation of the implement load, comprising:
   a transmission case constituting a structural member of the tractor;
   a pair of lower links functioning for connecting the said soil-engaging implement to the transmission case;
   a sensor bar mounted on the transmission case in such a manner as to show displacement responsive to the implement traction load exerted on the lower links;
   a detection device adapted to detect the amount of the displacement of the sensor bar, the detection device being accommodated in and secured to the transmission case in an oil-tight manner, provided, however, with means for allowing access thereto for enabling easy mantling and dismantling thereof from outside the transmission case;
   a casing accommodating therein the detection device establishing complete sealing or approximately establishing such state, said detection device comprising a sensor body and a sensor retractably mounted on the sensor body; and
   the transmission case having an opening in a floor plate thereof for accommodating the said casing as may be brought in therethrough from outside, and the said case having as one constituent element thereof, a releasable lid for the said opening.

2. The tractor of claim 1, wherein casing portion proper (27) of the said casing (23) is adapted to releasably be fixed to the said releasable lid (26), and the detection device (25) is adapted to releasably be fixed to the said casing portion proper (27).

3. The tractor of claim 2, wherein an O-ring (28) is inserted in between the said casing portion proper (27) and the releasable lid (26).

4. The tractor of claim 2 or 3, wherein an oil-tight sealing member (24) is inserted in between the releasable lid (26) and the transmission case (9).

5. The tractor of claim 2, wherein the sensor bar (12,113) is disposed to extend through bottom portions of the transmission case (9,109) and is rotatably supported thereon.

6. The tractor of claim 5, further comprising means (21) for locking the sensor bar (12) not to allow axial movement thus for preventing same from falling out on either lateral side of the transmission case (9), said means being adapted to be set in resilient fitting engagement with both the sensor bar (12) and the transmission case (9).

7. The tractor of claim 6, wherein said axial movement locking means (21) at such a resilient fitting portion is constructed as a generally C-shaped ring adapted to be set in resilient fitting engagement with both an annular groove (19) defined peripherally on the inner surface of the transmission case (9), through which the sensor bar (12) extends, and an annular groove (20) defined peripherally on the outer surface of the sensor bar (12).

* * * * *